US011090873B1

(12) United States Patent
Douglas

(10) Patent No.: US 11,090,873 B1
(45) Date of Patent: Aug. 17, 2021

(54) OPTIMIZING ANALYSIS OF A 3D PRINTED OBJECT THROUGH INTEGRATION OF GEO-REGISTERED VIRTUAL OBJECTS

(71) Applicant: Robert Edwin Douglas, Winter Park, FL (US)

(72) Inventor: Robert Edwin Douglas, Winter Park, FL (US)

( * ) Notice: Subject to any disclaimer, the term of this patent is extended or adjusted under 35 U.S.C. 154(b) by 0 days.

(21) Appl. No.: 17/075,799

(22) Filed: Oct. 21, 2020

Related U.S. Application Data

(63) Continuation-in-part of application No. 16/779,658, filed on Feb. 2, 2020, now Pat. No. 10,846,911.

(51) Int. Cl.
| | | |
|---|---|---|
| *H04N 7/18* | (2006.01) | |
| *B29C 64/393* | (2017.01) | |
| *H04N 13/344* | (2018.01) | |
| *G06T 19/00* | (2011.01) | |
| *G06T 19/20* | (2011.01) | |

(52) U.S. Cl.
CPC .......... *B29C 64/393* (2017.08); *G06T 19/006* (2013.01); *G06T 19/20* (2013.01); *H04N 13/344* (2018.05); *G06T 2219/004* (2013.01)

(58) Field of Classification Search
CPC .................................................... B29C 64/393
USPC ........................................................ 345/424
See application file for complete search history.

(56) References Cited

U.S. PATENT DOCUMENTS

| | | | | |
|---|---|---|---|---|
| 5,271,401 | A * | 12/1993 | Fishman | A61B 6/507 424/9.4 |
| 5,412,703 | A * | 5/1995 | Goodenough | G01N 23/046 378/4 |
| 5,535,747 | A * | 7/1996 | Katakura | A61B 8/04 600/438 |
| 6,847,336 | B1* | 1/2005 | Lemelson | G16H 20/40 345/8 |
| 8,384,771 | B1* | 2/2013 | Douglas | H04N 13/221 348/53 |
| 9,349,183 | B1* | 5/2016 | Douglas | H04N 13/275 |
| 2002/0048343 | A1* | 4/2002 | Launay | A61B 6/504 378/98.12 |
| 2003/0048357 | A1* | 3/2003 | Kain | G03B 15/006 348/144 |
| 2003/0225513 | A1* | 12/2003 | Gagvani | G06T 17/05 701/431 |
| 2005/0017972 | A1* | 1/2005 | Poole | A61B 8/461 345/424 |
| 2005/0168461 | A1* | 8/2005 | Acosta | G06T 15/08 345/419 |
| 2006/0178580 | A1* | 8/2006 | Nakamura | G06K 9/00067 600/438 |
| 2006/0181482 | A1* | 8/2006 | Iaquinto | A61B 90/36 345/8 |
| 2006/0197837 | A1* | 9/2006 | Flath | G06T 7/32 348/143 |

(Continued)

*Primary Examiner* — Leron Beck

(57) ABSTRACT

In this patent, a method and apparatus for improving analysis of a 3D printed object is provided. A first portion of a 3D dataset is selected for 3D printing. The 3D dataset is geo-registered to the 3D printed object. A second portion of the 3D dataset is displayed on a head display unit (HDU). Additional advanced features are discussed herein. An example would be performing 3D printing of a heart from a CT scan and displaying the aorta and inferior vena cave on the HDU geo-registered to the 3D printed heart.

20 Claims, 11 Drawing Sheets

(56) References Cited

U.S. PATENT DOCUMENTS

| | | | | |
|---|---|---|---|---|
| 2006/0241458 | A1* | 10/2006 | Hayashi | A61B 8/06 600/453 |
| 2007/0024612 | A1* | 2/2007 | Balfour | G06F 16/954 345/419 |
| 2007/0263915 | A1* | 11/2007 | Mashiach | G06K 9/4638 382/130 |
| 2008/0240616 | A1* | 10/2008 | Haering | G06T 7/80 382/294 |
| 2009/0321636 | A1* | 12/2009 | Ragucci | G01S 19/14 250/330 |
| 2010/0081912 | A1* | 4/2010 | McKenna | A61B 5/02007 600/368 |
| 2011/0196237 | A1* | 8/2011 | Pelissier | A61B 8/467 600/454 |
| 2011/0257561 | A1* | 10/2011 | Gertner | A61B 5/4893 601/2 |
| 2011/0316854 | A1* | 12/2011 | Vandrovec | G06T 17/20 345/420 |
| 2012/0215096 | A1* | 8/2012 | Gilboa | A61B 34/20 600/424 |
| 2013/0188848 | A1* | 7/2013 | Helm | A61B 6/12 382/131 |
| 2013/0230224 | A1* | 9/2013 | Claude | A61B 5/055 382/131 |
| 2014/0307067 | A1* | 10/2014 | Douglas | H04N 13/363 348/53 |
| 2015/0379351 | A1* | 12/2015 | Dibenedetto | A63B 24/0062 345/633 |
| 2017/0367766 | A1* | 12/2017 | Mahfouz | A61B 17/1703 |
| 2018/0047304 | A1* | 2/2018 | Sankaran | G16H 50/50 |
| 2018/0116728 | A1* | 5/2018 | Lang | A61B 17/1742 |
| 2018/0168730 | A1* | 6/2018 | Nazy | G06T 19/003 |
| 2018/0168740 | A1* | 6/2018 | Ryan | A61B 34/25 |
| 2019/0057555 | A1* | 2/2019 | Gallop | G06T 15/08 |

\* cited by examiner

Viewing options
- Update position and orientation data of geo-registered 3D printed object(s), if applicable
- Modify the 3D dataset based on:
    - Conventional viewing strategies (e.g., modifying the visual representation, such as changing the color and tranparency, filtering, etc.)
    - Advanced viewing strategies (e.g., US Patent 10,586,400, PROCESSING 3D MEDICAL IMAGES TO ENHANCE VISUALIZATION)
    - Interaction of 3D dataset with geo-registered tools, as described in US Patent 10,712,837, USING GEO-REGISTERED TOOLS TO MANIPULATE THREE-DIMENSIONAL MEDICAL IMAGES
    - Interaction of 3D dataset with virtual tools, as described in PCT/US19/47891, A VIRTUAL TOOL KIT FOR 3D IMAGING
    - "Ghost imaging" per US Patent Application 16/010,925, INTERACTIVE PLACEMENT OF A 3D DIGITAL REPRESENTATION OF A SURGICAL DEVICE OR ANATOMIC FEATURE INTO A 3D RADIOLOGIC IMAGE FOR PRE-OPERATIVE PLANNING
    - Flow visualization features, as described in US Patent Applications 16/506,073, A METHOD FOR ILLUSTRATING DIRECTION OF BLOOD FLOW VIA POINTERS, and 16/779,658, 3D IMAGING OF VIRTUAL FLUIDS AND VIRTUAL SOUNDS
    - Voxel manipulation strategies, per US Patent Application 16/195,251, INTERACTIVE VOXEL MANIPULATION IN VOLUMETRIC MEDICAL IMAGING FOR VIRTUAL MOTION, DEFORMABLE TISSUE, AND VIRTUAL RADIOLOGICAL DISSECTION

Fig. 2

RENDERING VOXELS OF A 3D DATASET, WHICH LIE OUTSIDE OF THE 3D PRINTED OBJECT

DISPLAYING VOXELS ON THE HDU WHICH LIE PARTIALLY INSIDE AND PARTIALLY OUTSIDE OF THE 3D PRINTED OBJECT

Perform geo-registration such that the 3D printed object and the 3D dataset are geo-registered
600

Keeping at least some voxels in the 3D dataset correspond to the 3D printed object
601

Display the a selected group of voxels on the HDU
602

RENDERING VOXELS OF A 3D DATASET, WHICH LIE INSIDE OF THE 3D PRINTED OBJECT

GEO-REGISTERING 4D DATASETS TO A 3D PRINTED OBJECT

VIEWING A 3D PRINTED OBJECT AND GEO-REGISTERED TOOL WITHOUT AND WITH THE HDU

3D PRINTED OBJECT FROM A FIRST VOLUME CO-REGISTERED TO A 3D PRINTED OBJECT FROM A SECOND VOLUME

INCORPORATION OF A RANGE OF VIRTUAL OBJECTS REGISTERED TO A 3D PRINTED OBJECT

Options for second imaging dataset
- Anatomic feature
- Pathologic feature
- Surgical hardware
- Modified version of the original 3D dataset in Figure 1, such as data unit assurance, voxel manip
- Simulated dataset (e.g., GANs out of thin air, GANs to represent a hypothetical 3D dataset at a future time point)

OPTIMIZING ANALYSIS OF A 3D PRINTED OBJECT THROUGH INTEGRATION OF GEO-REGISTERED VIRTUAL OBJECTS

CROSS REFERENCE TO RELATED APPLICATIONS

This application claims priority to U.S. patent application Ser. No. 16/779,658 filed on Feb. 2, 2020, which claims the benefit of U.S. Provisional application 62/906,125, filed on Sep. 26, 2019.

TECHNICAL FIELD

Aspects of this disclosure are generally related to use of distribution of work.

INTRODUCTION 3D printing is useful in medicine because it provides the surgeon with a patient-specific tangible anatomical model.

SUMMARY

All examples, aspects and features mentioned in this document can be combined in any technically conceivable way.

This patent teaches a method, software and apparatus for improving analysis of a 3D printed object.

In the preferred embodiment, the method comprises: performing a scan of a structure to yield a 3D dataset; selecting a first portion of the 3D dataset for 3D printing; performing 3D printing of the first portion to yield a 3D printed object; performing geo-registration of the 3D dataset to the 3D printed object; determining a second portion of the 3D dataset to be displayed on a head display unit; and displaying, in the head display unit (HDU), an image for left eye based on the left eye view point, the left eye viewing angle and the second portion and an image for the right eye based on the right eye view point, the right eye viewing angle and the second portion wherein a user viewing the left eye image and right eye image sees a 3D image. The rendering process is further described in U.S. Pat. No. 8,384,771, METHOD AND APPARATUS FOR THREE DIMENSIONAL VIEWING OF IMAGES, which is incorporated by reference in its entirety.

Some embodiments comprise modifying the geo-registered 3D dataset by using a geo-registered tool. Some embodiments comprise modifying the geo-registered 3D dataset by using a virtual tool. Some embodiments comprise modifying the geo-registered 3D dataset by performing voxel manipulation. Some embodiments comprise modifying the geo-registered 3D dataset by incorporating a flow visualization feature.

Some embodiments comprise wherein the second portion contains of a subset of the first portion. Some embodiments comprise performing alteration of the visual representation of the second portion by changing at least one of the group consisting of: color; grayscale; and, transparency.

Some embodiments comprise wherein the HDU displays annotations for the 3D printed object. Some embodiments comprise wherein the first portion represents a movable object and wherein the HDU displays the first portion dynamically.

Some embodiments comprise wherein a tangible feature on the 3D printed object is marked and the corresponding digital feature on the 3D dataset is localized.

Some embodiments comprise performing a deformation of the 3D dataset prior to performing 3D printing of the first portion.

Some embodiments comprise registering a second 3D dataset of the structure wherein the second 3D dataset is acquired at a different time point onto the 3D printed object; and displaying the second 3D dataset on the HDU.

Some embodiments comprise registering a second 3D dataset of the structure; and displaying the second 3D dataset on the HDU.

Some embodiments comprise wherein the second 3D dataset comprises an anatomic feature.

Some embodiments comprise wherein the second 3D dataset comprises a pathologic feature.

Some embodiments comprise wherein the second 3D dataset comprises surgical hardware onto the 3D printed object.

Some embodiments comprise wherein the second 3D dataset comprises a modified version of the 3D dataset.

Some embodiments comprise wherein the second 3D dataset comprises a simulated dataset.

Some embodiments comprise computer-readable storage device comprising:

instructions which, when executed by a computer, cause the computer to carry out the steps of: utilizing a 3D dataset wherein the 3D dataset is acquired via a scan of a structure; selecting a first portion of the 3D dataset for 3D printing; sending a file containing the first portion to a 3D printer to yield a 3D printed object; performing geo-registration of the 3D dataset to the 3D printed object; determining a second portion of the 3D dataset to be displayed on a head display unit; and displaying, in the head display unit (HDU), an image for left eye based on the left eye view point, the left eye viewing angle and the second portion and an image for the right eye based on the right eye view point, the right eye viewing angle and the second portion wherein a user viewing the left eye image and right eye image sees a 3D image.

Some embodiments comprise an apparatus comprising: an IO device; and an image processor in communication with the IO device, the image processors comprising a program stored on computer-readable non-transitory media, the program comprising: instructions that utilize a 3D dataset wherein the 3D dataset is acquired via a scan of a structure; instructions that select a first portion of the 3D dataset for 3D printing; instructions that send a file containing the first portion to a 3D printer to yield a 3D printed object; instructions that perform geo-registration of the 3D dataset to the 3D printed object; instructions that determine a second portion of the 3D dataset to be displayed on a head display unit; and instructions that cause the head display unit (HDU) to display an image for left eye based on the left eye view point, the left eye viewing angle and the second portion and an image for the right eye based on the right eye view point, the right eye viewing angle and the second portion wherein a user viewing the left eye image and right eye image sees a 3D image.

BRIEF DESCRIPTION OF THE FIGURES

FIG. 2 illustrates viewing options.

FIG. 11 illustrates registering a range of virtual objects to a 3D printed object.

DETAILED DESCRIPTIONS

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 1:
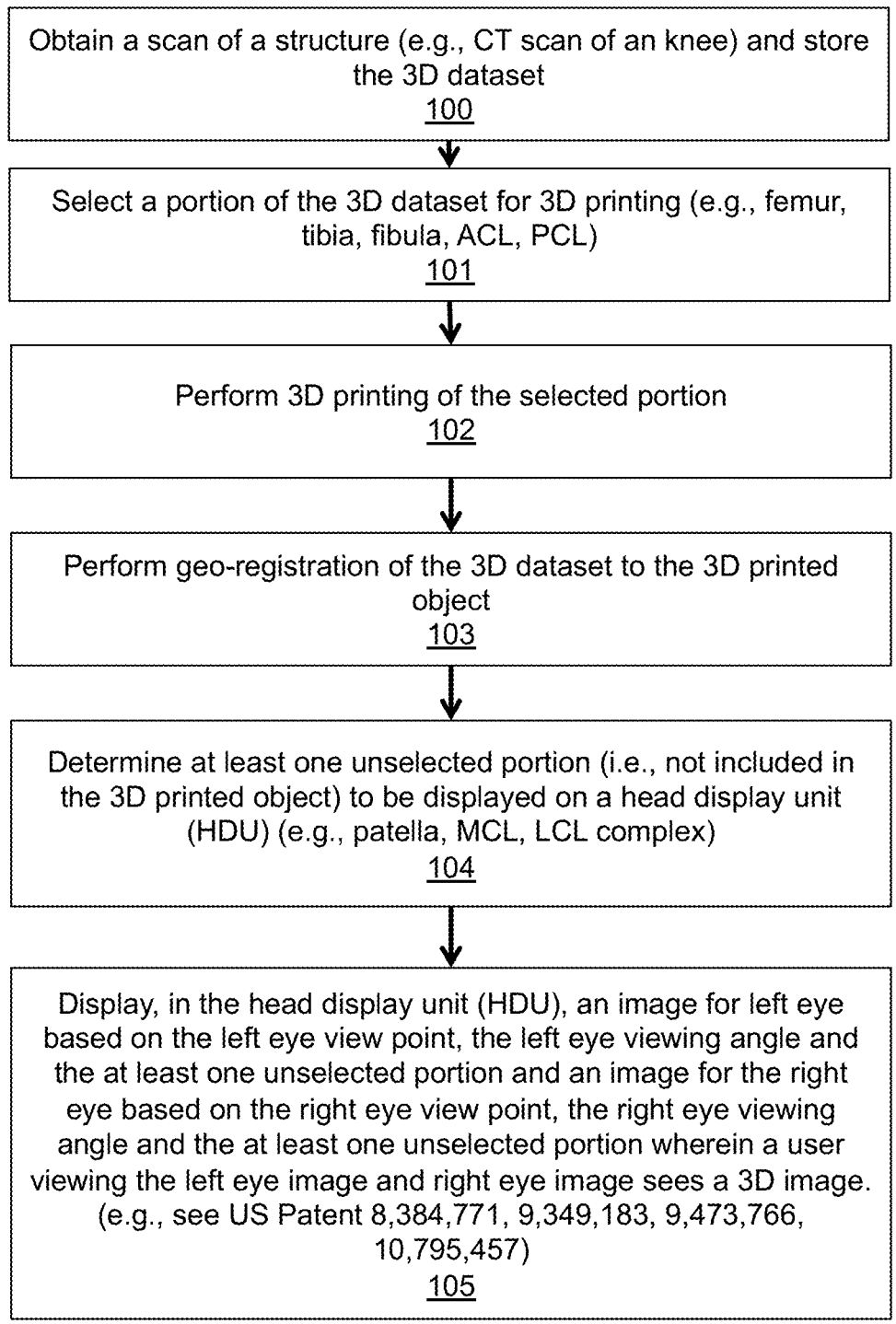
FIG. 1 illustrates the processing strategy for this patent.

FIG. 1 illustrates the processing strategy for this patent. 100 illustrates obtaining a scan of a structure (e.g., CT scan of an knee) and store the 3D dataset. 101 illustrates selecting a portion of the 3D dataset for 3D printing (e.g., femur, tibia, fibula, ACL, PCL). 102 illustrates performing 3D printing of the selected portion. 103 illustrates performing geo-registration of the 3D dataset to the 3D printed object. 104 illustrates determining at least one unselected portion (i.e., not included in the 3D printed object) to be displayed on a head display unit (HDU) (e.g., patella, MCL, LCL complex). 105 illustrates displaying, in the head display unit (HDU), an image for left eye based on the left eye view point, the left eye viewing angle and the at least one unselected portion and an image for the right eye based on the right eye view point, the right eye viewing angle and the at least one unselected portion wherein a user viewing the left eye image and right eye image sees a 3D image. (e.g., see U.S. Pat. Nos. 8,384,771, 9,349,183, 9,473,766, 10,795,457), FIG. 2 illustrates viewing options. To optimize viewing, the user can rotate and move the 3D printed object. In addition, the user can move the head, turn the head and change gaze direction. While this is being performed, the HDU will provide rendered image of the virtual object, which is geo-registered to the tangible 3D printed object. In addition, the user can modify the 3D dataset based on a variety of conventional viewing strategies, such as modifying the visual representation, such as changing the color and transparency of a segmented structure. In addition, the user can perform filtering of the 3D dataset, which is described in U.S. Pat. No. 8,384,771, which is incorporated by reference in its entirety. For example, the user can view the virtual image in grayscale and the 3D printed object in color. In addition, the user can modify the virtual object through a range of advanced viewing strategies. The user can implement a double windowing technique via U.S. Pat. No. 10,586,400, PROCESSING 3D MEDICAL IMAGES TO ENHANCE VISUALIZATION, which is incorporated by reference in its entirety. The user can implement an interaction of 3D dataset with geo-registered tools, as described in U.S. Pat. No. 10,712,837, USING GEO-REGISTERED TOOLS TO MANIPULATE THREE-DIMENSIONAL MEDICAL IMAGES, which is incorporated by reference in its entirety. Examples of geo-registered tools include, but are not limited to the following: knife; scissors; platform; forceps; staples; and, a wide range of other types of surgical tools. The user can perform interaction of 3D dataset with virtual tools, as described in PCT/US19/47891, A VIRTUAL TOOL KIT FOR 3D IMAGING, which is incorporated by reference in its entirety. The user can perform "ghost imaging" per U.S. patent application Ser. No. 16/010,925, INTERACTIVE PLACEMENT OF A 3D DIGITAL REPRESENTATION OF A SURGICAL DEVICE OR ANATOMIC FEATURE INTO A 3D RADIOLOGIC IMAGE FOR PRE-OPERATIVE PLANNING, which is incorporated by reference in its entirety. The user can insert flow visualization features, as described in U.S. patent application Ser. No. 16/506,073, A METHOD FOR ILLUSTRATING DIRECTION OF BLOOD FLOW VIA POINTERS, and Ser. No. 16/779,658, 3D IMAGING OF VIRTUAL FLUIDS AND VIRTUAL SOUNDS, which are incorporated by reference in their entirety. The user can perform voxel manipulation strategies, per U.S. patent application Ser. No. 16/195,251, INTERACTIVE VOXEL MANIPULATION IN VOLUMETRIC MEDICAL IMAGING FOR VIRTUAL MOTION, DEFORMABLE TISSUE, AND VIRTUAL RADIOLOGICAL DISSECTION, which is incorporated by reference in its entirety.

Figure 3A:
FIG. 3A illustrates a 3D printed model of the heart.

FIG. 3A illustrates a 3D printed model of the heart. 300 illustrates the 3D printed model of the heart. 301 illustrates the aortic valve. 302 illustrates the pulmonary valve.

Figure 3B:
FIG. 3B illustrates what a user would see when looking at the heart through a head display unit.

FIG. 3B illustrates what a user would see when looking at the heart through a head display unit. 300 illustrates the 3D printed model of the heart, which is the real world, tangible object. 303 illustrates the pulmonary artery, which is a virtual object seen only when looking through the head display unit. 304 illustrates the aorta, which is a virtual object seen only when looking through the head display unit.

Figure 3C:
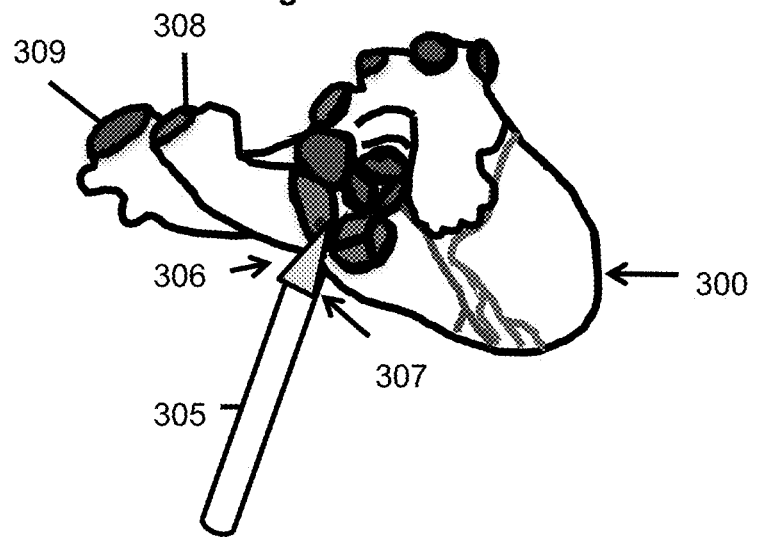
FIG. 3C illustrates what a user would see when looking at the heart through a head display unit with the display of a modified volume.

FIG. 3C illustrates what a user would see when looking at the heart through a head display unit with the display of a modified volume. 300 illustrates the 3D printed model of the heart, which is the real world, tangible object. 305 illustrates a geo-registered tool of a knife, which contains a non-cutting portion 306 and a cutting portion 307. The geo-registered knife is described further in U.S. Pat. No. 10,712,837, USING GEO-REGISTERED TOOLS TO MANIPULATE THREE-DIMENSIONAL MEDICAL IMAGES, which is incorporated by reference in its entirety. This object is held in one's hand is used to modify the virtual image which is geo-registered to the 3D printed object. 308 illustrates the shifted position of the pulmonary artery, which is a virtual object seen only when looking through the head display unit. Note that it is shifted due to the fact that it was virtually cut by the geo-registered tool. 309 illustrates the shifted position of the aorta, which is a virtual object seen only when looking through the head display unit. Note that it is shifted due to the fact that it was virtually cut by the geo-registered tool.

Figure 4A:
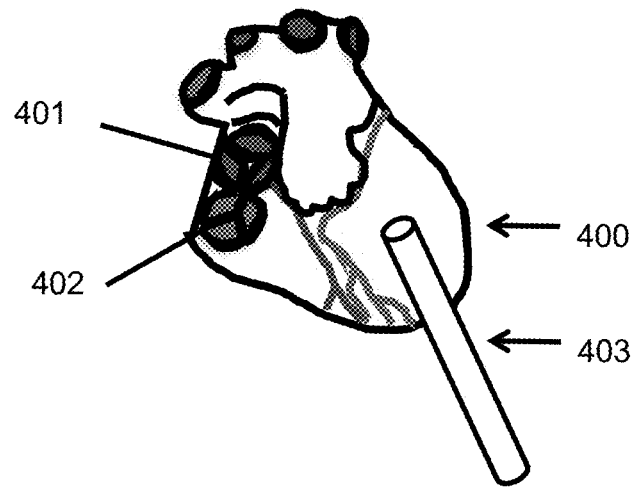
FIG. 4A illustrates a 3D printed model of the heart and a geo-registered tool.

FIG. 4A illustrates a 3D printed model of the heart. 400 illustrates the 3D printed model of the heart.

401 illustrates the aortic valve. 402 illustrates the pulmonary valve. 403 illustrates the geo-registered tool.

Figure 4B:
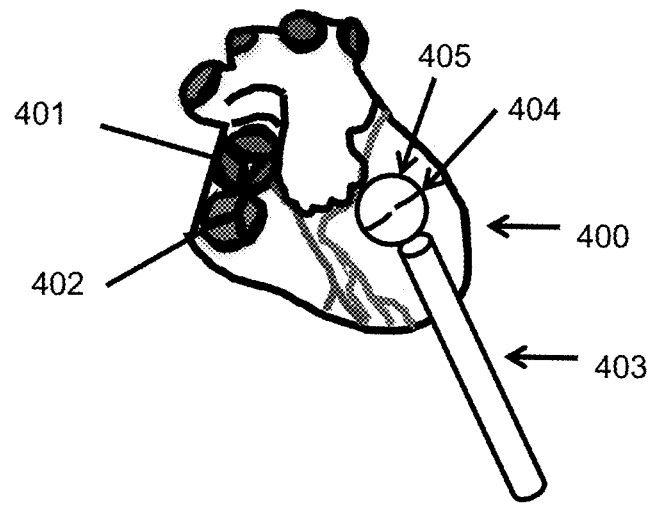
FIG. 4B illustrates what a user would see when looking at the heart through a head display unit.

FIG. 4B illustrates what a user would see when looking at the heart through a head display unit. 400 illustrates the 3D printed model of the heart, which is the real world, tangible object. 401 illustrates the aortic valve. 402 illustrates the pulmonary valve. 403 illustrates the geo-registered tool of a pointer, which is described further in U.S. Pat. No. 10,712,837, USING GEO-REGISTERED TOOLS TO MANIPULATE THREE-DIMENSIONAL MEDICAL IMAGES, which is incorporated by reference in its entirety. This object is held in one's hand is is used to modify the virtual image which is geo-registered to the 3D printed object. 404 illustrates a virtual hole, which allows peering in through the surface of the 3D printed object to see deeper structures. Note that the deeper structures can only be seen when looking through the augmented reality head display unit (HDU). This is further described in PCT/US19/47891, A VIRTUAL TOOL KIT FOR 3D IMAGING and U.S. patent application Ser. No. 15/949,202, SMART OPERATING ROOM EQUIPPED WITH SMART SURGICAL DEVICES, both of which are incorporated by reference in their entirety. 405 illustrates a virtual image of the mitral valve. Thus, the HDU can display virtual images located inside or outside of the 3D printed object wherein the virtual images are geo-registered to the 3D printed object. Thus, when a user rotates, or moves the 3D printed object, the virtual objects move along with the 3D printed object, just as if they were part of the object. Furthermore, the user has the ability to manipulate the virtual objects during the course of inspection of the geo-registered object. Doing this would be useful because the user would be able to understand the anatomy both inside the 3D printed object and the anatomy outside the 3D printed object better.

Figure 5A:
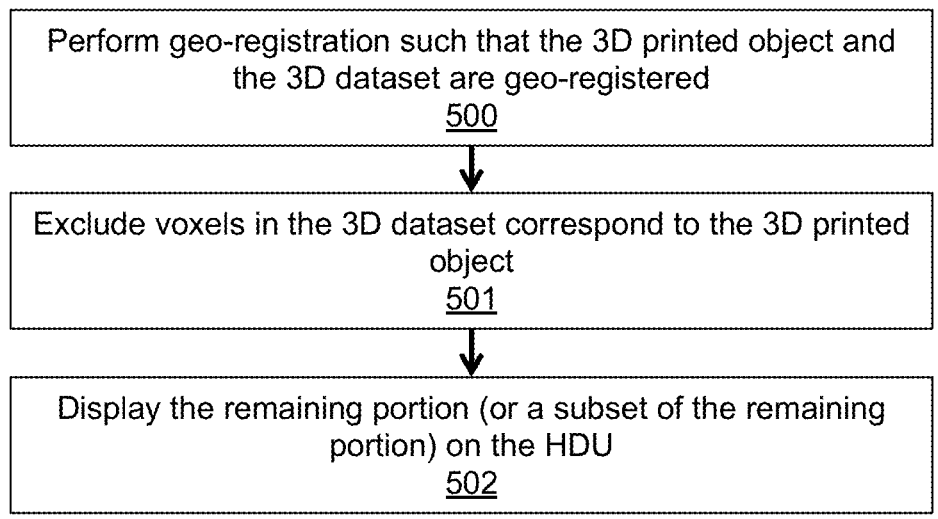
FIG. 5A illustrates a processing block for rendering voxels of a 3D dataset, which lie outside of the 3D printed object.

FIG. 5A illustrates a processing block for rendering voxels of a 3D dataset, which lie outside of the 3D printed object. 500 illustrates a processing block for performing geo-registration such that a 3D printed object and the 3D dataset are geo-registered. For example, the 3D dataset could be a CT scan of the abdomen. The 3D printed object could a kidney mass. 501 illustrates a processing block for excluding voxels in the 3D dataset correspond to the 3D printed object. To continue this example, the kidney mass has already been printed. Therefore, those voxels in the 3D dataset corresponding to the kidney mass can be excluded. 502 illustrates a processing block for display the remaining portion (or a subset of the remaining portion) on the HDU. To continue this example, the remaining structures (other than the kidney mass, which was excluded in processing block 501) are displayed. For example, the displayed structure could be the spleen, which lies completely outside and away from the kidney.

Figure 5B:
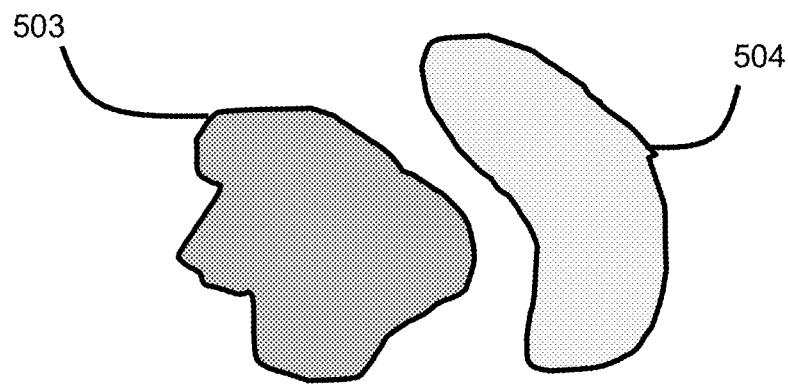
FIG. 5B illustrates the 3D printed object and the geo-registered virtual object wherein the geo-registered object lies completely outside of the 3D printed object.

FIG. 5B illustrates the 3D printed object and the geo-registered virtual object wherein the geo-registered object lies completely outside of the 3D printed object. 503 illustrates a left kidney mass, which is the 3D printed object. 504 illustrates a spleen, which is the portion of the 3D dataset displayed on the HDU. Note that the spleen is completely outside and away from the kidney. The amount of transparency could be adjusted per user preference. For example, the spleen could be rendered partially transparent. Alternatively, the spleen could be rendered non-transparent. This would provide the user who is studying a 3D printed object with context of the adjacent organs, which is therefore useful.

Figures 6A, 6B:
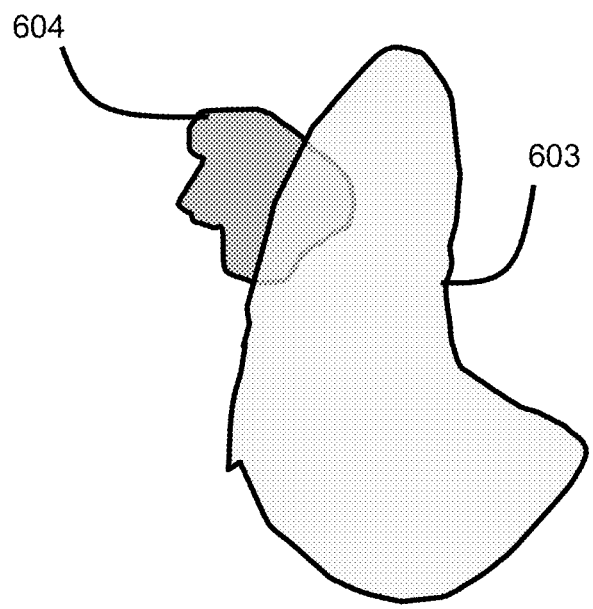
FIG. 6A illustrates a processing block for displaying voxels on the HDU which lie partially inside and partially outside of the 3D printed object.
FIG. 6B illustrates the 3D printed object and the geo-registered virtual object wherein the geo-registered object lies partially inside and partially outside of the 3D printed object.

FIG. 6A illustrates a processing block for displaying voxels on the HDU which lie partially inside and partially outside of the 3D printed object. 600 illustrates a processing block for performing geo-registration such that a 3D printed object and the 3D dataset are geo-registered. For example, the 3D dataset could be a CT scan of the chest. The 3D printed object could a lung mass. A wide range of medical and non-medical examples can be performed as well. 601 illustrates a processing block for keeping at least some voxels in the 3D dataset correspond to the 3D printed object. To continue this example, the lung has already been printed and it is partially transparent (e.g., tangible clear material). Therefore, at least some voxels in the 3D dataset corresponding to the lung can be included. 602 illustrates a processing block for displaying a selected group of voxels on the HDU. To continue this example, the lung mass is displayed on the HDU. Note that in this example a portion of the lung mass is located inside of the 3D printed object and a portion of the lung mass is located outside of the 3D printed object. This can occur if a lung cancer originates inside of the lung and grows outside of the lung and into the chest wall.

FIG. 6B illustrates the 3D printed object and the geo-registered virtual object wherein the geo-registered object lies partially inside and partially outside of the 3D printed object. 603 illustrates a lung, which is a 3D printed transparent object. 604 illustrates a lung mass, which is the virtual object displayed in the HDU. Another innovative idea is to print a generic transparent organ (e.g., a model organ) and then have patient-specific pathology be displayed on the HDU. This would save time by not having to print a patient specific organ every time. It would also improve communications between physicians and patients. It would also help in preoperative planning. The amount of transparency could be adjusted (both for the 3D printed object and the 3D virtual object displayed on the HDU) per user preference.

Figure 7A:
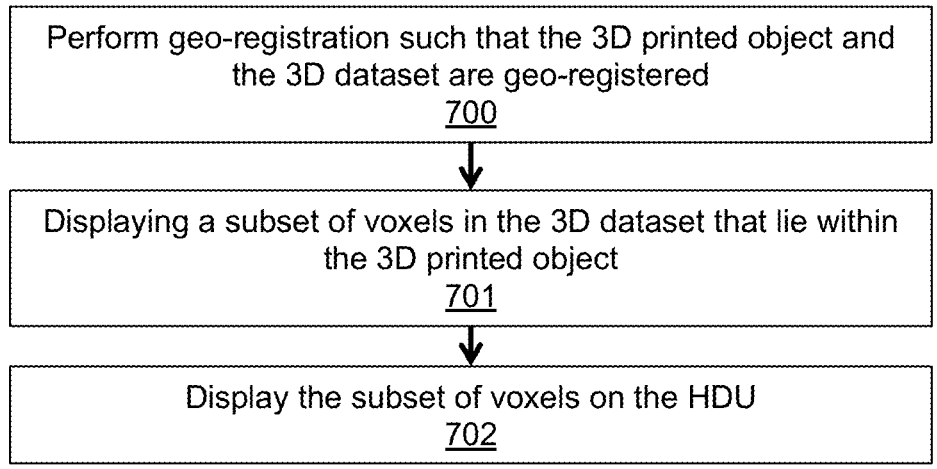
FIG. 7A illustrates a processing block for displaying voxels on the HDU which lie entirely inside of the 3D printed object.

FIG. 7A illustrates a processing block for displaying voxels on the HDU which lie entirely inside of the 3D printed object. 700 illustrates a processing block for performing geo-registration such that a 3D printed object and the 3D dataset are geo-registered. For example, the 3D dataset could be a CT scan of the chest. The 3D printed object could a lung mass. A wide range of medical and non-medical examples can be performed as well. 701 illustrates a processing block for displaying a subset of voxels in the 3D dataset that lie within the 3D printed object. To continue this example, the lung has already been printed and it is partially transparent (e.g., tangible clear material). Therefore, some voxels in the 3D dataset corresponding to a nodule inside of the lung are selected for display. 702 illustrates a processing block for displaying a selected subset of voxels on the HDU. To continue this example, the lung nodule is displayed on the HDU.

Figure 7B:
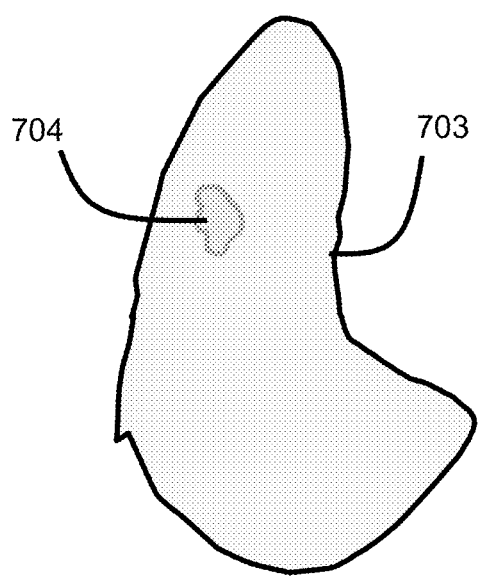
FIG. 7B illustrates the 3D printed object and the geo-registered virtual object wherein the virtual object lies entirely inside of the 3D printed object.

FIG. 7B illustrates the 3D printed object and the geo-registered virtual object wherein the virtual object lies entirely inside of the 3D printed object. 703 illustrates a lung, which is a 3D printed transparent object. 704 illustrates a lung nodule, which is the virtual object displayed only on the HDU.

Another innovative idea is to print a generic transparent organ (e.g., a model organ) and then have patient-specific pathology be displayed on the HDU. This would save time by not having to print a patient specific organ every time. It would also improve communications between physicians and patients. It would also help in preoperative planning. The amount of transparency could be adjusted (both for the 3D printed object and the 3D virtual object displayed on the HDU) per user preference. Other examples include performing 3D printing of a femur and performing add-on virtual objects (e.g., fracture, tumor, infection, etc.) visualized on the HDU.

Figure 8A:
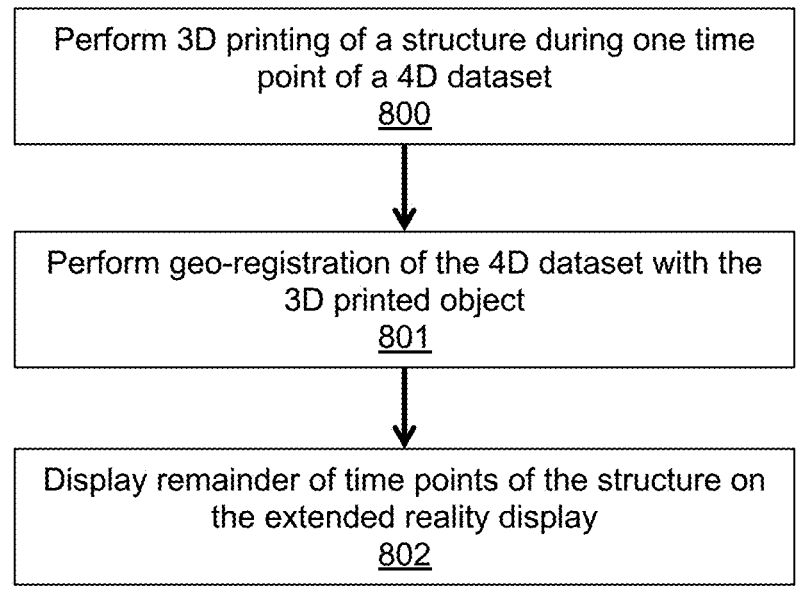
FIG. 8A illustrates a processing block for performing geo-registration of 4D datasets to a 3D printed object.

FIG. 8A illustrates a processing block for performing geo-registration of 4D datasets to a 3D printed object. 800 illustrates a processing block of performing 3D printing of a structure during one time point of a 4D dataset. 801 illustrates a processing block of performing geo-registration of the 4D dataset with the 3D printed object. Note that the preferred embodiment is to perform geo-registration of the virtual object at the same one phase that was printed. 802 illustrates a processing block of displaying the remainder of the time points of the structure on the extended reality display.

Figure 8B:
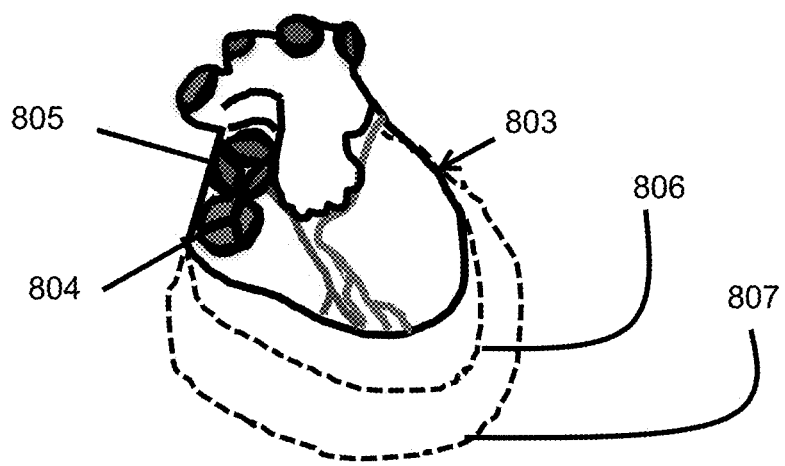
FIG. 8B illustrates a 3D printed object and a geo-registered virtual object.

FIG. 8B illustrates a 3D printed object and a geo-registered virtual object. 803 illustrates the 3D printed object, which is a heart (e.g. from a CT Scan). In the preferred embodiment, the tangible 3D printed object will be printed in the phase where the object (e.g., heart) is in its smallest size.

804 illustrates the pulmonic valve. 805 illustrates the aorta. 806 illustrates the outer contour of the virtual object of the heart in an enlarged phase, which is displayed on the HDU. 807 illustrates the outer contour of the virtual object of the heart in a maximally enlarged phase (end diastole), which is displayed on the HDU. Thus, the user can hold (via hand or via tool) the 3D printed heart and watch it enlarge over multiple heart beats on the HDU.

Figure 9A:
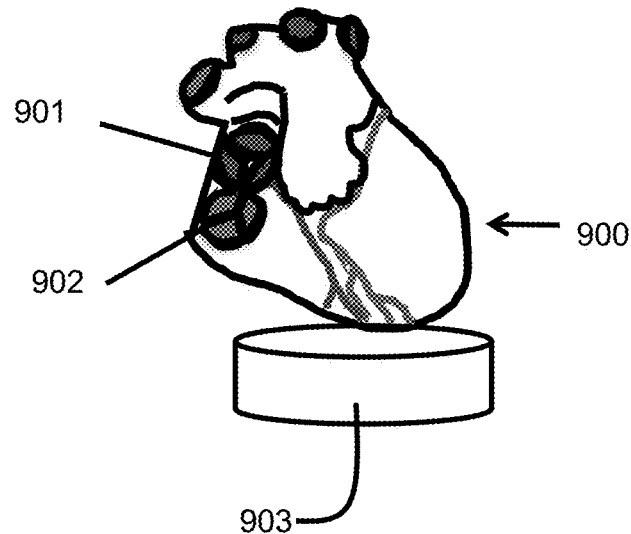
FIG. 9A illustrates viewing the geo-registered tool and 3D printed object without looking through the HDU.

FIG. 9A illustrates viewing the geo-registered tool and 3D printed object without looking through the HDU. 900 illustrates the 3D printed object, which is the heart. 901 illustrates the aortic valve portion of the 3D printed object. Note that the aorta was not printed. 902 illustrates the pulmonic valve portion of the 3D printed object. Note that the pulmonary valve was not printed. 903 illustrates the geo-registered tool, which in this case is a geo-registered platform.

Figure 9B:
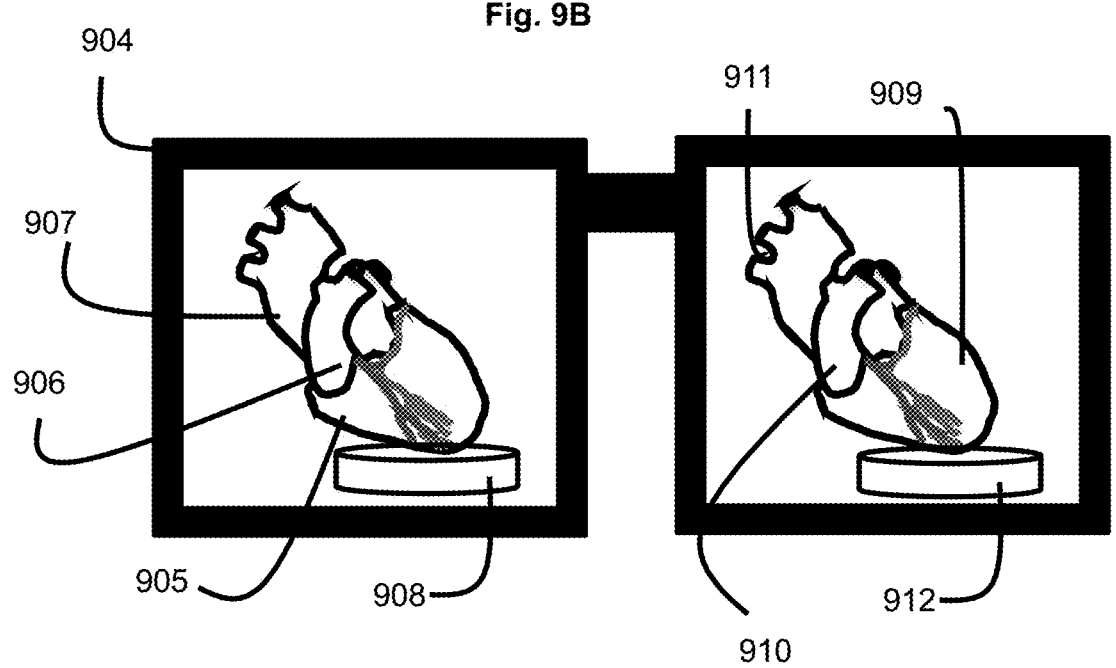
FIG. 9B illustrates viewing the geo-registered tool and 3D printed object through the HDU.

FIG. 9B illustrates viewing the geo-registered tool and 3D printed object through the HDU. 904 illustrates the HDU with a left eye image and right eye image. 905 illustrates the left eye view of the 3D printed object of the heart (e.g., printed from a CT scan) as it would be seen through the transparent HDU. Note that the heart is seen with and without the HDU because it is an actual tangible object. 906 illustrates the left eye view of the pulmonary artery, which is a virtual object geo-registered to the 3D printed object. Note that the pulmonary artery virtual object is only visible when looking through the HDU. 907 illustrates the left eye view of the aorta, which is a virtual object geo-registered to the 3D printed object. Note that the aorta virtual object is only visible when looking through the HDU. 908 illustrates the left eye view of a geo-registered tool, which in this case is a platform. 909 illustrates the right eye view of the 3D printed object of the heart (e.g., printed from a CT scan) as it would be seen through the transparent HDU. Note that the heart is seen with and without the HDU because it is an actual tangible object. 910 illustrates the right eye view of the pulmonary artery, which is a virtual object geo-registered to the 3D printed object. Note that the pulmonary artery virtual object is only visible when looking through the HDU. 911 illustrates the right eye view of the aorta, which is a virtual object geo-registered to the 3D printed object. Note that the aorta virtual object is only visible when looking through the HDU. 912 illustrates the right eye view of a geo-registered tool, which in this case is a platform. Note that this invention could work with a wide range of HDUs (e.g., HoloLens, Magic Leap and others). Also, as new displays (e.g., contact lenses) are invented (e.g., not requiring glasses or HDU), this registration technique is equally applicable.

Figure 10:
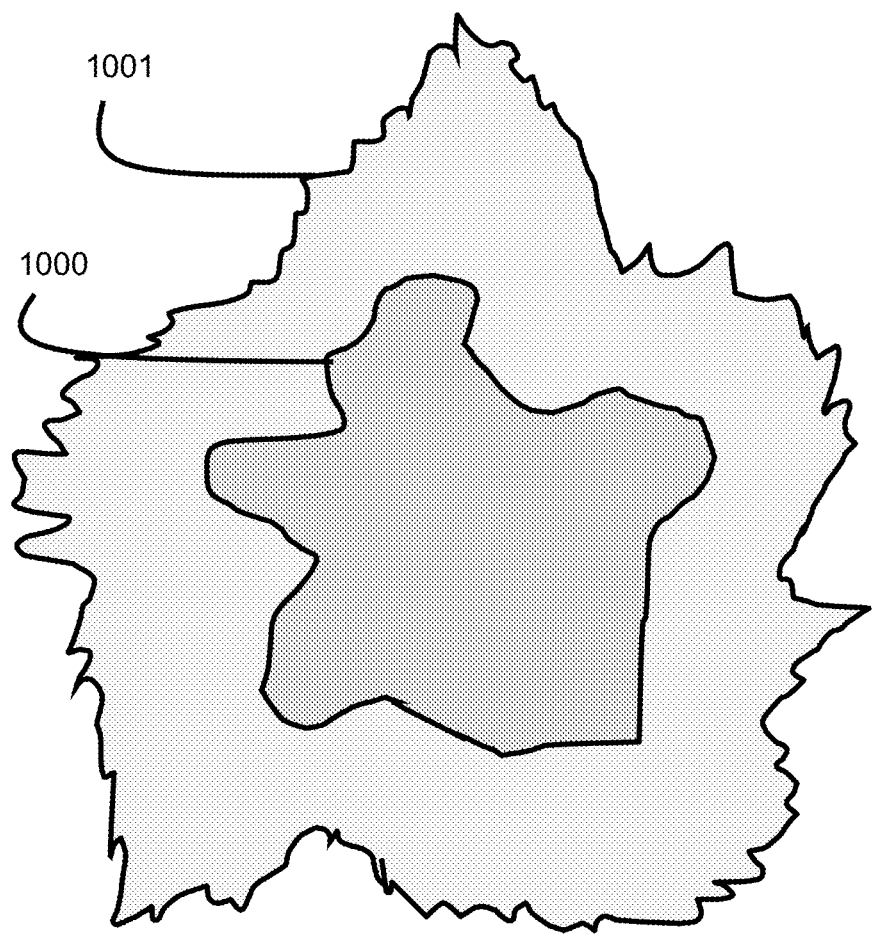
FIG. 10 illustrates a 3D printed object from a first volume co-registered to a 3D printed object from a second volume.

FIG. 10 illustrates a 3D printed object from a first volume co-registered to a 3D printed object from a second volume. 1000 illustrates the tangible 3D printed object, which in this example is a breast tumor obtained from a first volume (e.g., after treatment with chemotherapy). 1001 illustrates the intangible virtual object of the breast tumor obtained from a second volume (e.g., prior to treatment with chemotherapy). Note that the preferred embodiment would be to display the virtual object partially transparent. This is useful because it allows a user to hold a 3D printed object of the patient specific imaging finding (e.g., patient's own breast cancer) in their hand and visualize on the HDU what it looked like at a different time point. Note that this example is of a single imaging finding at two different time points. Multiple time points can be used. Additionally, datasets from different patients can be used. For example, a femur can be printed from a first patient. Then, pathology (e.g., fracture) from a different patient can be registered to and superimposed on the 3D printed object, such as is further explained in the next figure.

FIG. 11 illustrates registering a range of virtual objects to a 3D printed object. The purpose of this figure is to teach that a variety of datasets and virtual objects can be used to improve image analysis of the 3D printed object.

A first example is registering an anatomic feature from a first 3D dataset to the 3D printed object made from a second dataset. An example would be registering an anatomic feature of a tendon (e.g., Achilles tendon) from a first patient onto a 3D printed calcaneus from a second patient. This is further discussed in U.S. patent application Ser. No. 16/010, 925, INTERACTIVE PLACEMENT OF A 3D DIGITAL REPRESENTATION OF A SURGICAL DEVICE OR ANATOMIC FEATURE INTO A 3D RADIOLOGIC IMAGE FOR PRE-OPERATIVE PLANNING.

A second example is registering an pathologic feature from a first 3D dataset to the 3D printed object made from a second dataset. An example would be registering an pathologic feature of a ruptured tendon (e.g., ruptured Achilles tendon) from a first patient onto a 3D printed calcaneus from a second patient. This is further discussed in U.S. patent application Ser. No. 16/010,925, INTERACTIVE PLACEMENT OF A 3D DIGITAL REPRESENTATION OF A SURGICAL DEVICE OR ANATOMIC FEATURE INTO A 3D RADIOLOGIC IMAGE FOR PRE-OPERATIVE PLANNING.

A third example is registering a surgical hardware from a first 3D dataset to the 3D printed object made from a second dataset. An example would be registering an side plate and screws from a first 3D dataset onto a 3D printed femur from a second patient. This is further discussed in U.S. patent application Ser. No. 16/010,925, INTERACTIVE PLACEMENT OF A 3D DIGITAL REPRESENTATION OF A SURGICAL DEVICE OR ANATOMIC FEATURE INTO A 3D RADIOLOGIC IMAGE FOR PRE-OPERATIVE PLANNING.

A fourth example is performing a modified version of the original 3D dataset and registering the modified version to the 3D printed object made from the original dataset. An example would be printing a 3D object (e.g., kidney) from a patient's CT scan of the abdomen. Then, performing image processing of the CT scan of the abdomen, such that the dataset is modified. Examples of image processing include techniques described in: U.S. patent application Ser. No. 16/752,691, IMPROVING IMAGE QUALITY BY INCORPORATING DATA UNIT ASSURANCE MARKERS, which is incorporated by reference in its entirety and U.S. patent application Ser. No. 16/195,251, INTERACTIVE VOXEL MANIPULATION IN VOLUMETRIC MEDICAL IMAGING FOR VIRTUAL MOTION, DEFORMABLE TISSUE, AND VIRTUAL RADIOLOGICAL DISSECTION, which is incorporated by reference in its entirety.

A fifth example is generating a simulated dataset and then performing registration of the simulated dataset onto a 3D printed object. For example, a simulated dataset can be generated by methods described in U.S. patent application Ser. No. 16/703,629, RADIOLOGIST-ASSISTED MACHINE LEARNING WITH INTERACTIVE, VOLUME SUBTENDING 3D CURSOR, which is incorporated by reference in its entirety and U.S. patent application Ser. No. 16/736,731, RADIOLOGIST-ASSISTED MACHINE LEARNING WITH INTERACTIVE, VOLUME SUBTENDING 3D CURSOR, which is incorporated by reference in its entirety.

What is claimed is:

1. A method comprising:
   selecting a first portion of a 3D dataset for 3D printing;
   performing 3D printing of the first portion to yield a tangible 3D printed object;
   selecting a second portion of said 3D dataset to generate a virtual 3D object
      wherein said second portion of said 3D object dataset is different from said first portion, and
      wherein said second portion of said 3D dataset is in proximity to said first portion;
   registering said virtual 3D object to said tangible 3D printed object
      wherein a location of said virtual 3D object is fixed with respect to a location of said tangible 3D printed object, and
      wherein an orientation of said virtual 3D object is fixed with respect to an orientation of said tangible 3D printed object,
   rendering a left eye image of said virtual 3D object for a left eye of a user based on a left eye view point, a viewing angle and said virtual 3D object;
   rendering a right eye image of said virtual 3D object for a right eye of said user based on a right eye view point, said viewing angle and said virtual 3D object;
   displaying in an augmented reality head display unit (HDU) said left eye image on a left eye display of said augmented reality HDU wherein said user looking through said left eye display with said left eye sees: a left eye view of said tangible 3D printed object, and said left eye image of said virtual 3D object; and
   displaying in an augmented reality HDU said right eye image on a right eye display wherein a user looking through said right eye display with said right eye sees: a right eye view of said tangible 3D printed object; and said right eye image of said virtual 3D object.

2. The method of claim 1 further comprising modifying said virtual 3D object by using a tangible tool
   wherein a position and orientation of said tangible tool is tracked,
   wherein a position and orientation of said virtual 3D object is tracked, and
   wherein said modifying said virtual 3D object is based on at least said position of said tool with respect to said virtual 3D object.

3. The method of claim 1 further comprising modifying said virtual 3D object by using a virtual tool
   wherein a position and orientation of said tangible tool is tracked,
   wherein a position and orientation of said virtual 3D object is tracked, and
   wherein said modifying said virtual 3D object is based on at least said position of said tool with respect to said virtual 3D object.

4. The method of claim 1 further comprising modifying said virtual 3D object by using by performing a deformation of said virtual 3D object.

5. The method of claim 1 further comprising modifying said virtual 3D object by incorporating a flow visualization feature.

6. The method of claim 1 further comprising:
   wherein said tangible 3D printed object contains a structure made of transparent material; and
   wherein at least some of said virtual 3D object is located within said structure made of transparent material.

7. The method of claim 1 further comprising performing alteration of the visual representation of the said virtual 3D object by changing at least one of the group consisting of: color; grayscale; and, transparency.

8. The method of claim 1 further comprising wherein said augmented reality HDU displays annotations for said tangible 3D printed object.

9. The method of claim 1 further comprising wherein said augmented reality HDU displays said virtual 3D object dynamically.

10. The method of claim 1 further comprising wherein a tangible feature on the tangible 3D printed object is marked and a corresponding digital feature within the 3D dataset is localized.

11. The method of claim 1 further comprising performing a deformation of the 3D dataset prior to said performing 3D printing of the first portion to yield a tangible 3D printed object.

12. The method of claim 1 further comprising:
   registering a second virtual 3D object from a second 3D dataset onto said tangible 3D printed object
      wherein an orientation of said second virtual object is fixed with respect to an orientation of said tangible 3D printed object;
   rendering a left eye image of said second virtual 3D object for said left eye of said user based on a left eye view point, a viewing angle and said second virtual 3D object;
   rendering a right eye image of said second virtual 3D object for said right eye of said user based on a right eye view point, said viewing angle and said second virtual 3D object;

displaying in said augmented reality HDU said left eye image of said second virtual 3D object on said left eye display of said augmented reality HDU wherein said user looking through said left eye display with said left eye sees:
a left eye view of said tangible 3D printed object; and
said left eye image of said second virtual 3D object; and
displaying in said augmented reality HDU said right eye image of said second virtual 3D object on said right eye display wherein said user looking through said right eye display with said right eye sees:
a right eye view of said tangible 3D printed object; and
said right eye image of said second virtual 3D object.

13. The method of claim 12 further comprising:
wherein said 3D dataset and said 3D dataset are both generated by performing a scan of a structure;
wherein said 3D dataset is acquired of said structure at a first time point;
wherein the second 3D dataset is acquired at a second time point; and
wherein said first time point and said second time point are different time points.

14. The method of claim 12 further comprising wherein the second 3D dataset comprises an anatomic feature.

15. The method of claim 12 further comprising wherein the second 3D dataset comprises a pathologic feature.

16. The method of claim 12 further comprising wherein the second 3D dataset comprises surgical hardware.

17. The method of claim 12 further comprising wherein the second 3D dataset comprises a modified version of the 3D dataset.

18. The method of claim 12 further comprising wherein the second 3D dataset comprises a simulated dataset.

19. A non-transitory computer readable storage medium comprising:
instructions which, when executed by a computer, cause the computer to carry out the steps of:
selecting a first portion of a 3D dataset for 3D printing;
performing 3D printing of the first portion to yield a tangible 3D printed object;
selecting a second portion of said 3D dataset to generate a virtual 3D object
wherein said second portion of said 3D object dataset is different from said first portion, and
wherein said second portion of said 3D dataset is in proximity to said first portion;
registering said virtual 3D object to said tangible 3D printed object
wherein a location of said virtual 3D object is fixed with respect to a location of said tangible 3D printed object, and
wherein an orientation of said virtual 3D object is fixed with respect to an orientation of said tangible 3D printed object,
rendering a left eye image of said virtual 3D object for a left eye of a user based on a left eye view point, a viewing angle and said virtual 3D object;
rendering a right eye image of said virtual 3D object for a right eye of said user based on a right eye view point, said viewing angle and said virtual 3D object;
displaying in an augmented reality head display unit (HDU) said left eye image on a left eye display of said augmented reality HDU wherein said user looking through said left eye display with said left eye sees:
a left eye view of said tangible 3D printed object, and
said left eye image of said virtual 3D object; and
displaying in an augmented reality HDU said right eye image on a right eye display of wherein a user looking through said right eye display with said right eye sees:
a right eye view of said tangible 3D printed object, and
said right eye image of said virtual 3D object.

20. An apparatus comprising:
an augmented reality head display unit (HDU);
a 3D printer; and
an image processor in communication with the augmented reality head display unit (HDU) and the 3D printer, the image processors comprising a program stored on computer-readable non-transitory media, the program comprising:
instructions that select a first portion of a 3D dataset for 3D printing;
instructions that cause said 3D printer to print the first portion of said 3D dataset to yield a tangible 3D printed object;
instructions that select a second portion of said 3D dataset to generate a virtual 3D object
wherein said second portion of said 3D dataset is different from said first portion, and
wherein said second portion of said 3D dataset is in proximity to said first portion;
instructions that register said virtual 3D object to said tangible 3D printed object
wherein a location of said virtual 3D object is fixed with respect to a location of said tangible 3D printed object, and
wherein an orientation of said virtual 3D object is fixed with respect to an orientation of said tangible 3D printed object;
instructions that render a left eye image of said virtual 3D object for a left eye of a user based on a left eye view point, a viewing angle and said virtual 3D object;
instructions that render a right eye image of said virtual 3D object for a right eye of said user based on a right eye view point, said viewing angle and said virtual 3D object;
instructions that display in an augmented reality head display unit (HDU) said left eye image on a left eye display of said augmented reality HDU wherein said user looking through said left eye display with said left eye sees:
a left eye view of said tangible 3D printed object; and
said left eye image of said virtual 3D object; and
instructions that display in an augmented reality HDU said right eye image on a right eye display wherein a user looking through said right eye display with said right eye sees:
a right eye view of said tangible 3D printed object; and
said right eye image of said virtual 3D object.

* * * * *